(12) United States Patent
Gonze et al.

(10) Patent No.: US 9,140,159 B2
(45) Date of Patent: *Sep. 22, 2015

(54) HIGH EXHAUST TEMPERATURE, ZONED, ELECTRICALLY-HEATED PARTICULATE MATTER FILTER

(76) Inventors: Eugene V. Gonze, Pinckney, MI (US); Michael J. Paratore, Jr., Howell, MI (US); Garima Bhatia, Bangalore (IN)

( * ) Notice: Subject to any disclaimer, the term of this patent is extended or adjusted under 35 U.S.C. 154(b) by 737 days.

This patent is subject to a terminal disclaimer.

(21) Appl. No.: 11/950,545

(22) Filed: Dec. 5, 2007

(65) Prior Publication Data

US 2009/0071126 A1   Mar. 19, 2009

Related U.S. Application Data

(60) Provisional application No. 60/973,324, filed on Sep. 18, 2007.

(51) Int. Cl.

| | |
|---|---|
| *F01N 3/00* | (2006.01) |
| *F01N 3/035* | (2006.01) |
| *F01N 3/025* | (2006.01) |
| *F01N 3/027* | (2006.01) |
| *F01N 9/00* | (2006.01) |
| *F02D 41/02* | (2006.01) |
| *F01N 13/00* | (2010.01) |

(52) U.S. Cl.
CPC .............. *F01N 3/035* (2013.01); *F01N 3/025* (2013.01); *F01N 3/027* (2013.01); *F01N 9/002* (2013.01); *F01N 13/009* (2014.06); *F02D 41/029* (2013.01); *F02D 41/0245* (2013.01); *F01N 2240/16* (2013.01); *Y02T 10/26* (2013.01); *Y02T 10/47* (2013.01)

(58) Field of Classification Search
CPC ......... F01N 3/025; F01N 3/027; F01N 3/035; F01N 9/002; F01N 13/009
USPC ............................................................ 60/297
See application file for complete search history.

(56) References Cited

U.S. PATENT DOCUMENTS

| | | | | |
|---|---|---|---|---|
| 4,427,418 | A | * | 1/1984 | Kogiso et al. ................... 55/287 |
| 4,516,993 | A | * | 5/1985 | Takeuchi et al. ................ 55/283 |
| 4,655,037 | A | * | 4/1987 | Rao ................................. 60/274 |

(Continued)

FOREIGN PATENT DOCUMENTS

| | | |
|---|---|---|
| CN | 1517526 A | 8/2004 |
| CN | 1920267 A | 2/2007 |

(Continued)

*Primary Examiner* — Thomas Denion
*Assistant Examiner* — Jason Shanske

(57) ABSTRACT

A system includes a particulate matter (PM) filter, an electric heater, and a control circuit. The electric heater includes multiple zones, which each correspond to longitudinal zones along a length of the PM filter. A first zone includes multiple discontinuous sub-zones. The control circuit determines whether regeneration is needed based on an estimated level of loading of the PM filter and an exhaust flow rate. In response to a determination that regeneration is needed, the control circuit: controls an operating parameter of an engine to increase an exhaust temperature to a first temperature during a first period; after the first period, activates the first zone; deactivates the first zone in response to a minimum filter face temperature being reached; subsequent to deactivating the first zone, activates a second zone; and deactivates the second zone in response to the minimum filter face temperature being reached.

19 Claims, 8 Drawing Sheets

(56) References Cited

U.S. PATENT DOCUMENTS

| | | | |
|---|---|---|---|
| 5,085,049 A * | 2/1992 | Rim et al. | 60/274 |
| 5,144,798 A * | 9/1992 | Kojima et al. | 60/303 |
| 5,171,335 A * | 12/1992 | Kojima et al. | 55/523 |
| 5,746,989 A * | 5/1998 | Murachi et al. | 423/213.7 |
| 6,090,172 A * | 7/2000 | Dementhon et al. | 55/282.3 |
| 6,572,682 B2 * | 6/2003 | Peter et al. | 95/278 |
| 6,770,116 B2 * | 8/2004 | Kojima | 95/14 |
| 6,971,337 B2 * | 12/2005 | Guinther et al. | 123/1 A |
| 8,388,741 B2 * | 3/2013 | Gonze | 95/278 |
| 2004/0244362 A1 * | 12/2004 | Hiranuma et al. | 60/276 |
| 2009/0071127 A1 | 3/2009 | Gonze et al. | |
| 2009/0071128 A1 | 3/2009 | Gonze et al. | |
| 2009/0071129 A1 | 3/2009 | Gonze et al. | |
| 2009/0071338 A1 | 3/2009 | Gonze et al. | |
| 2009/0113883 A1 * | 5/2009 | Bhatia et al. | 60/320 |
| 2010/0095655 A1 | 4/2010 | Gonze et al. | |
| 2010/0186384 A1 * | 7/2010 | Gonze et al. | 60/286 |
| 2010/0186385 A1 * | 7/2010 | Gonze et al. | 60/286 |
| 2010/0205943 A1 * | 8/2010 | Gonze et al. | 60/286 |
| 2011/0214569 A1 | 9/2011 | Gonze et al. | |
| 2011/0259190 A1 | 10/2011 | Gonze et al. | |
| 2012/0192717 A1 | 8/2012 | Gonze | |

FOREIGN PATENT DOCUMENTS

| | | |
|---|---|---|
| DE | 3205810 A1 | 8/1983 |
| DE | 19533355 A1 | 3/1997 |
| DE | 60119300 T2 | 4/2007 |
| DE | 60131590 T2 | 10/2008 |
| EP | 1146216 A2 | 10/2001 |
| EP | 1273772 A1 | 1/2003 |

* cited by examiner

HIGH EXHAUST TEMPERATURE, ZONED, ELECTRICALLY-HEATED PARTICULATE MATTER FILTER

CROSS-REFERENCE TO RELATED APPLICATIONS

This application claims the benefit of U.S. Provisional Patent Application No. 60/973,324, filed on Sep. 18, 2007.

STATEMENT OF GOVERNMENT RIGHTS

This disclosure was produced pursuant to U.S. Government Contract No. DE-FC-04-03 AL67635 with the Department of Energy (DoE). The U.S. Government has certain rights in this disclosure.

FIELD

The present disclosure relates to particulate matter (PM) filters, and more particularly to high exhaust temperature, zoned electrically-heated PM filters.

BACKGROUND

The statements in this section merely provide background information related to the present disclosure and may not constitute prior art.

Engines such as diesel engines produce particulate matter (PM) that is filtered from exhaust gas by a PM filter. The PM filter is disposed in an exhaust system of the engine. The PM filter reduces emission of PM that is generated during combustion.

Over time, the PM filter becomes full. During regeneration, the PM may be burned within the PM filter. Regeneration may involve heating the PM filter to a combustion temperature of the PM. There are various ways to perform regeneration including modifying engine management, using a fuel burner, using a catalytic oxidizer to increase the exhaust temperature with after injection of fuel, using resistive heating coils, and/or using microwave energy. The resistive heating coils are typically arranged in contact with the PM filter to allow heating by both conduction and convection.

Diesel PM combusts when temperatures above a combustion temperature such as 600° C. are attained. The start of combustion causes a further increase in temperature. While spark-ignited engines typically have low oxygen levels in the exhaust gas stream, diesel engines have significantly higher oxygen levels. While the increased oxygen levels make fast regeneration of the PM filter possible, it may also pose some problems.

PM reduction systems that use fuel tend to decrease fuel economy. For example, many fuel-based PM reduction systems decrease fuel economy by 5%. Electrically heated PM reduction systems reduce fuel economy by a negligible amount. However, durability of the electrically heated PM reduction systems has been difficult to achieve.

SUMMARY

A system comprises a particulate matter (PM) filter including an upstream end for receiving exhaust gas and a downstream end. An electric heater is arranged one of spaced from and in contact with the upstream end. A control module increases an exhaust temperature above a soot oxidation temperature before activating the electric heater to regenerate downstream portions of the PM filter.

A method comprises providing a particulate matter (PM) filter comprises an upstream end for receiving exhaust gas and a downstream end; arranging an electric heater one of spaced from and in contact with said upstream end; increasing an exhaust temperature above a soot oxidation temperature before activating said electric heater to regenerate downstream portions of said PM filter from said one of said N zones.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
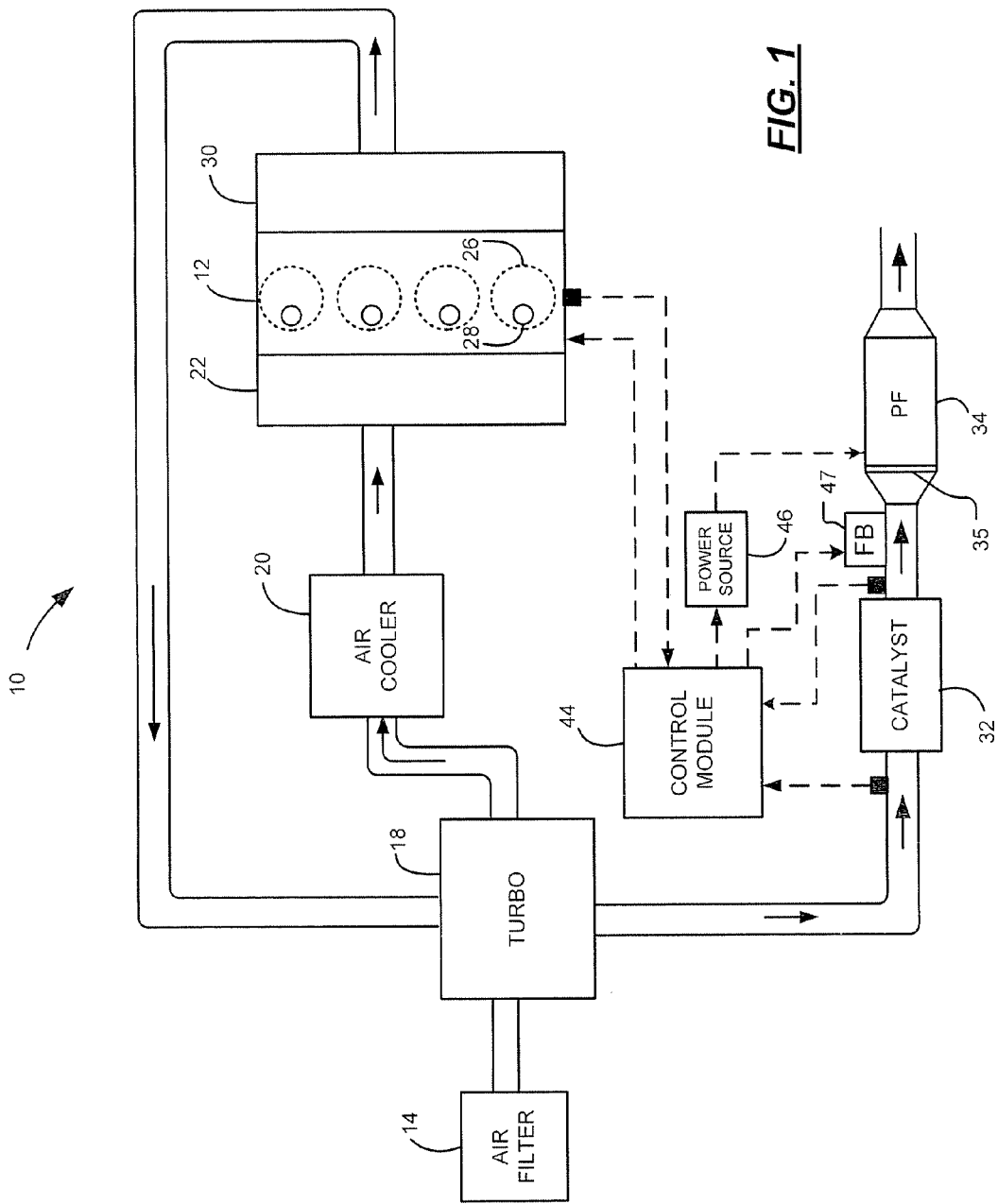
FIG. 1 is a functional block diagram of an exemplary engine including a particulate matter (PM) filter with a zoned inlet heater.

The following description is merely exemplary in nature and is not intended to limit the present disclosure, application, or uses. It should be understood that throughout the drawings, corresponding reference numerals indicate like or corresponding parts and features.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure raises the exhaust temperature in any suitable manner before performing regeneration using an electrical heater to enable more robust PM filter regeneration. For example only, the inlet exhaust temperature may be raised above a soot oxidation temperature. The temperature of the exhaust gas entering an inlet of the PM filter may be increased by modifying engine management, using a fuel burner, using a catalytic oxidizer to increase the exhaust temperature with after injection of fuel, and/or using any other suitable approaches.

For example, the exhaust temperature may be raised to a temperature above 550 degrees Celsius. This temperature range is greater than or equal to a typical soot oxidation temperature and higher than the natural exhaust temperature. This temperature may be less than the regeneration temperature.

Once the temperature of the exhaust gas input to the PM filter is increased, the electrical heater initiates regeneration. For example, a zoned electric heater may activate heated zones, which causes a soot combustion wave to travel down the PM filter channel cleaning the filter. This process continues until all of the heater zones are regenerated. When PM filter regenerations are run with an inlet exhaust temperature in the increased temperature range described herein, the combustion flamefronts are less likely to be extinguished. The increased inlet exhaust temperature also creates a smaller temperature delta, which reduces thermal stress forces. Regeneration also occurs more quickly.

The electrical heater can be zoned or unzoned. The electrical heater may be in contact with or spaced from the PM filter. The heater selectively heats all or portions of the PM filter. The PM filter may be in contact with or mounted close enough to the front of the PM filter to control the heating pattern. The length of the heater may be set to optimize the exhaust gas temperature.

Thermal energy is transmitted from the heater to the PM filter. The PM filter may be heated by convection and/or conduction. The electrical heater may be divided in zones to reduce electrical power required to heat the PM filter. The zones also heat selected downstream portions within the PM filter. By heating only the selected portions of the filter, the magnitude of forces in the substrate is reduced due to thermal expansion. As a result, higher localized soot temperatures may be used during regeneration without damaging the PM filter.

The PM filter may be regenerated by selectively heating one or more of the zones in the front of the PM filter and igniting the soot using the heated exhaust gas. When a sufficient face temperature is reached, the heater may be turned off and the burning soot then cascades down the length of the PM filter channel, which is similar to a burning fuse on a firework. The burning soot is the fuel that continues the regeneration. This process is continued for each heating zone until the PM filter is completely regenerated.

The heater zones may be spaced in a manner such that thermal stress is mitigated between active heaters. Therefore, the overall stress forces due to heating are smaller and distributed over the volume of the entire electrically heated PM filter. This approach allows regeneration in larger segments of the electrically heated PM filter without creating thermal stresses that damage the electrically heated PM filter.

A largest temperature gradient tends to occur at edges of the heaters. Therefore, activating one heater past the localized stress zone of another heater enables more actively heated regeneration volume without an increase in overall stress. This tends to improve the regeneration opportunity within a drive cycle and reduces cost and complexity since the system does not need to regenerate as many zones independently.

Referring now to FIG. 1, an exemplary diesel engine system 10 is schematically illustrated in accordance with the present disclosure. It is appreciated that the diesel engine system 10 is merely exemplary in nature and that the zone heated particulate filter regeneration system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 10 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a V-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PM filter) assembly 34 with an inlet heater 35. The heater 35 may be zoned. Optionally, an EGR valve (not shown) recirculates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32, through the heater 35 and into the PM filter assembly 34. The DOC 32 oxidizes the exhaust based on the post combustion air/fuel ratio. The amount of oxidation increases the temperature of the exhaust. The PM filter assembly 34 receives exhaust from the DOC 32 and filters any soot particulates present in the exhaust. The inlet heater 35 is in contact with or spaced from the PM filter assembly 34 and heats the exhaust to a regeneration temperature as will be described below.

A control module 44 controls the engine and PM filter regeneration based on various sensed information. More specifically, the control module 44 estimates loading of the PM filter assembly 34. When the estimated loading is at a predetermined level and the exhaust flow rate is within a desired range, current may be controlled to the PM filter assembly 34 via a power source 46 to initiate the regeneration process. The duration of the regeneration process may be varied based upon the estimated amount of particulate matter within the PM filter assembly 34.

Current is applied to the heater 35 during the regeneration process. More specifically, the energy may heat selected zones of the heater 35 of the PM filter assembly 34 for predetermined periods, respectively. Exhaust gas passing through the heater 35 is heated by the activated zones. The heated exhaust gas travels to the downstream filter of PM filter assembly 34 and heats the filter by convection and/or conduction. The remainder of the regeneration process is achieved using the heat generated by the heated exhaust passing through the PM filter.

The control module may increase the temperature of the exhaust gas entering an inlet of the PM filter using any suitable approach. For example, engine management may modify engine management such as the timing and/or amount of fuel supplied to the cylinders. Alternately, a fuel burner 47 may be used. The fuel burner 47 may be arranged in the exhaust and may selectively introduce fuel into the exhaust between the engine and PM filter. Alternately, the catalytic oxidizer may be used to increase the exhaust temperature with after injection of fuel. In other words, excess fuel may be injected during the exhaust part of the cycle.

Figure 2:
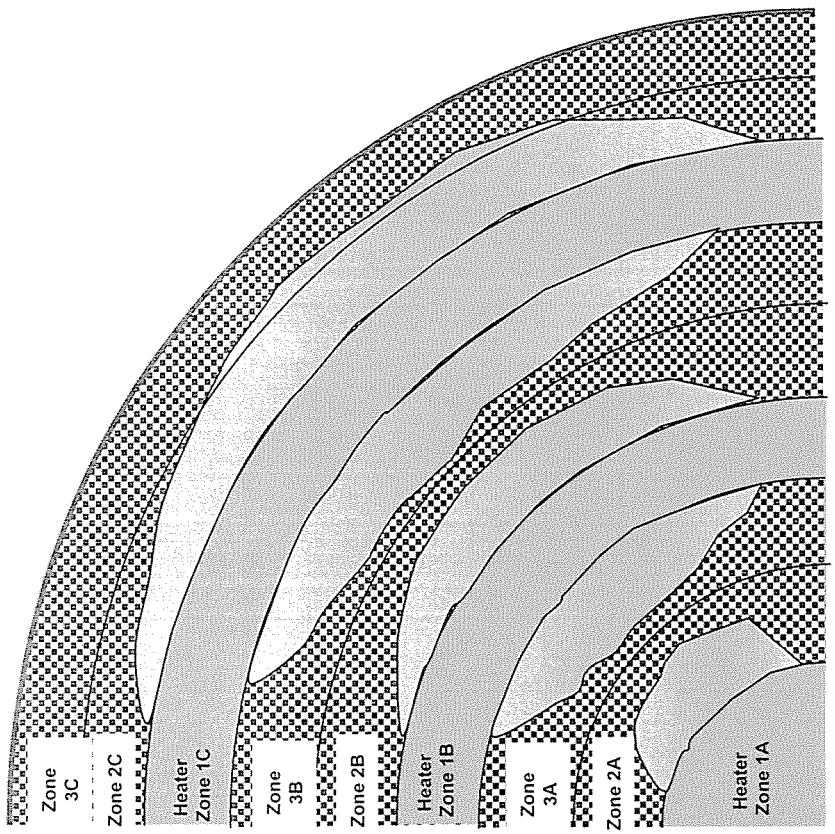
FIG. 2 illustrates exemplary zoning of the zoned inlet heater of the electrically heated particulate matter (PM) filter of FIG. 1 in further detail.

Referring now to FIG. 2, an exemplary zoned inlet heater 35 for the PM filter assembly 34 is shown in further detail. The electrically heated PM filter assembly 34 is arranged spaced from or in contact with the PM filter assembly 34. The PM filter assembly 34 includes multiple spaced heater zones including zone 1 (with sub-zones 1A, 1B and 1C), zone 2 (with sub-zones 2A, 2B and 2C) and zone 3 (with sub-zones 3A, 3B and 3C). The zones 1, 2 and 3 may be activated during different respective periods.

As exhaust gas flows through the activated zones of the heater, regeneration occurs in the corresponding portions of the PM filter that initially received the heated exhaust gas (e.g. areas downstream from the activated zones) or downstream areas that are ignited by cascading burning soot. The corresponding portions of the PM filter that are not downstream from an activated zone act as stress mitigation zones. For example in FIG. 2, sub-zones 1A, 1B and 1C are activated and sub-zones 2A, 2B, 2C, 3A, 3B, and 3C act as stress mitigation zones.

The corresponding portions of the PM filter downstream from the active heater sub-zones 1A, 1B and 1C thermally expand and contract during heating and cooling. The stress mitigation sub-zones 2A and 3A, 2B and 3B, and 2C and 3C mitigate stress caused by the expansion and contraction of the heater sub-zones 1A, 1B and 1C. After zone 1 has completed regeneration, zone 2 can be activated and zones 1 and 3 act as stress mitigation zones. After zone 2 has completed regeneration, zone 3 can be activated and zones 1 and 2 act as stress mitigation zones.

Figure 3:
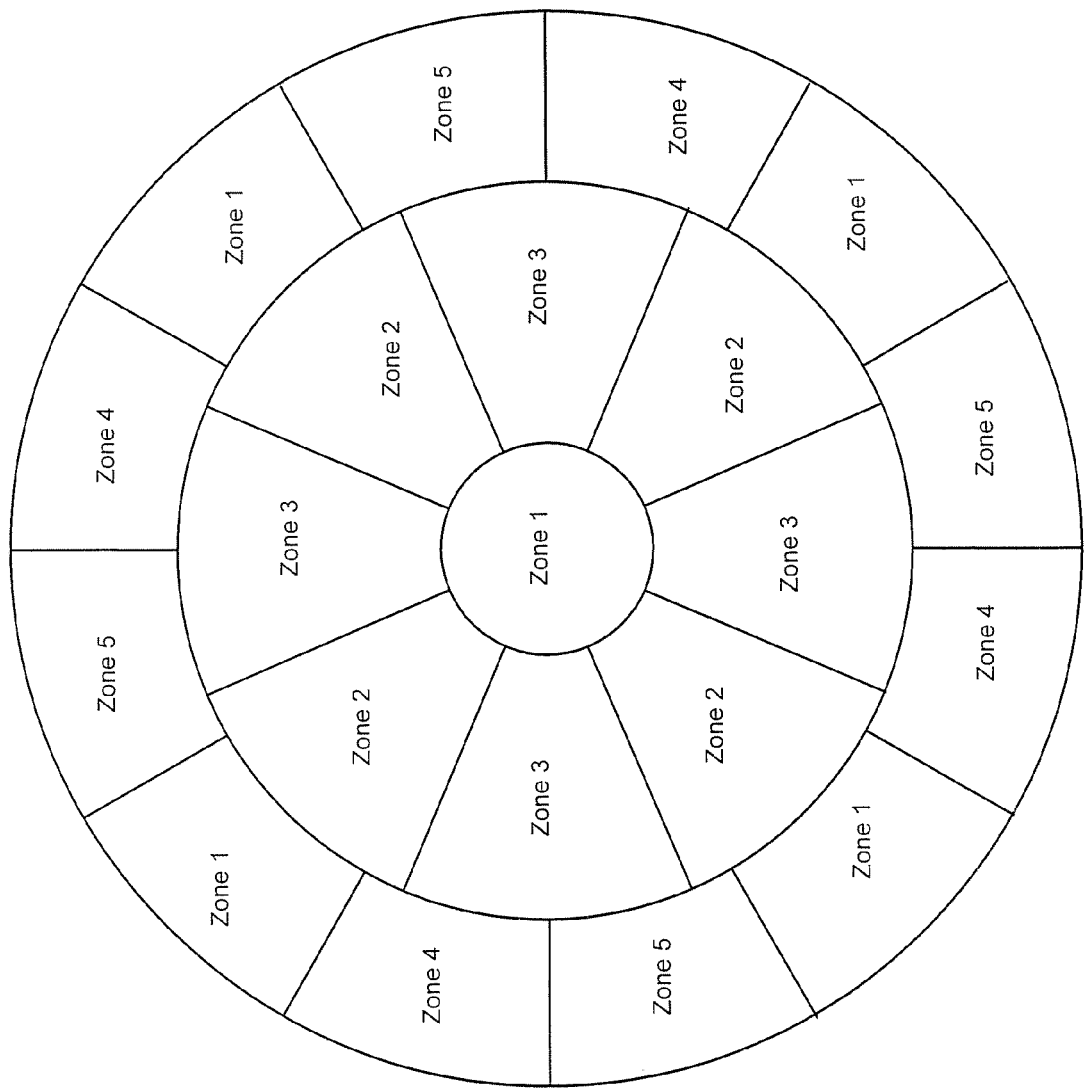
FIG. 3 illustrates exemplary zoning of the zoned inlet heater of the electrically heated PM filter of FIG. 1 in further detail.

Referring now to FIG. 3, another exemplary zoned inlet heater arrangement is shown. A center portion may be surrounded by a middle zone including a first circumferential band of zones. The middle portion may be surrounded by an outer portion including a second circumferential band of zones.

In this example, the center portion includes zone 1. The first circumferential band of zones includes zones 2 and 3. The second circumferential band of zones comprises zones 1, 4 and 5. As with the embodiment described above, downstream portions from active zones are regenerated while downstream portions from inactive zones provide stress mitigation. As can be appreciated, one of the zones 1, 2, 3, 4 and 5 can be activated at a time. Others of the zones remain inactivated.

Figure 4:
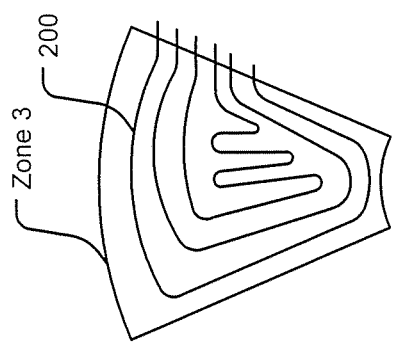
FIG. 4 illustrates an exemplary resistive heater in one of the zones of the zoned inlet heater of FIG. 3.

Referring now to FIG. 4, an exemplary resistive heater 200 arranged adjacent to one of the zones (e.g. zone 3) from the first circumferential band of zones in FIG. 3 is shown. The resistive heater 200 may comprise one or more coils that cover the respective zone to provide sufficient heating.

Figure 5:
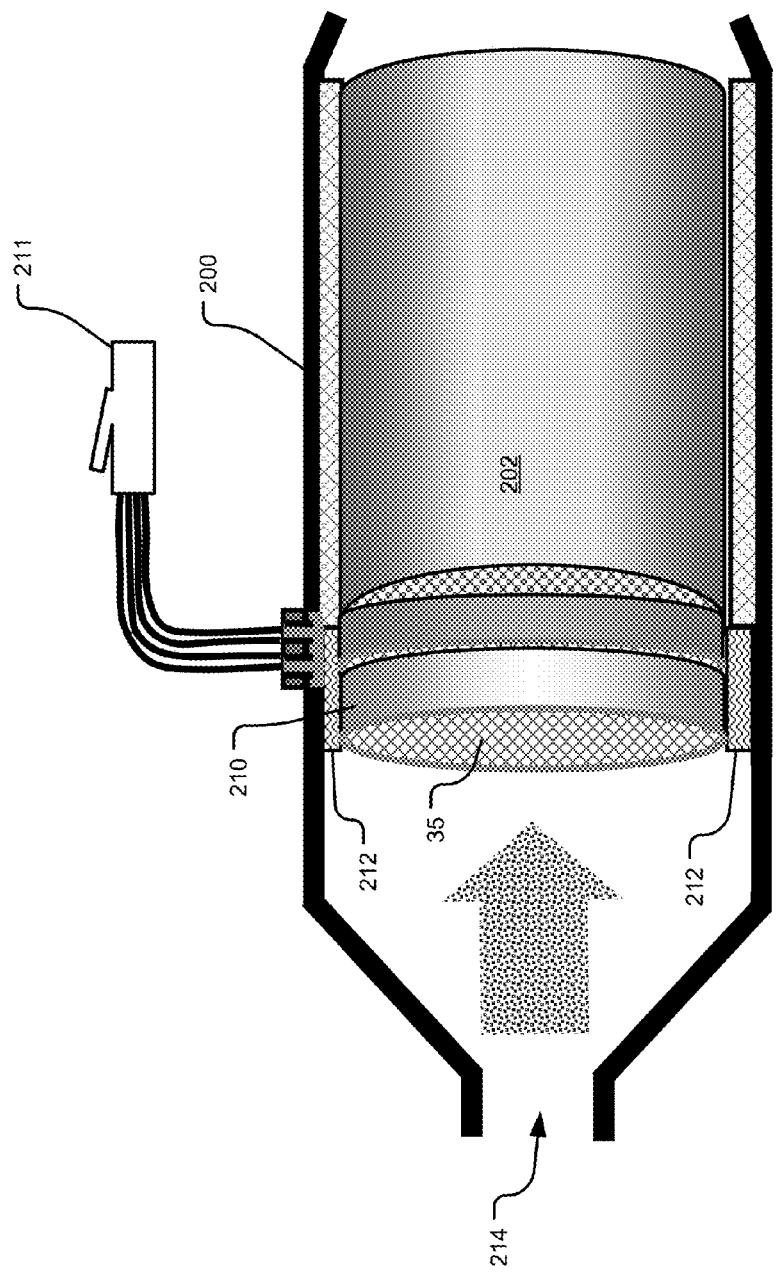
FIG. 5 illustrates the electrically heated PM filter having a zoned electric heater.

Referring now to FIG. 5, the PM filter assembly 34 is shown in further detail. The PM filter assembly 34 includes a housing 200, a filter 202, and the zoned heater 35. The filter 202 may include a rear endplug 208. The heater 35 may be arranged between a laminar flow element 210 and a substrate of the filter 202. An electrical connector 211 may provide current to the zones of the PM filter assembly 34 as described above.

As can be appreciated, the heater 35 may be in contact with or spaced from the filter 202 such that the heating is convection and/or conduction heating. Insulation 212 may be arranged between the heater 35 and the housing 200. Exhaust gas enters the PM filter assembly 34 from an upstream inlet 214 and is heated by one or more zones of the PM filter assembly 34. The heated exhaust gas is received by the filter 202.

Figure 6:
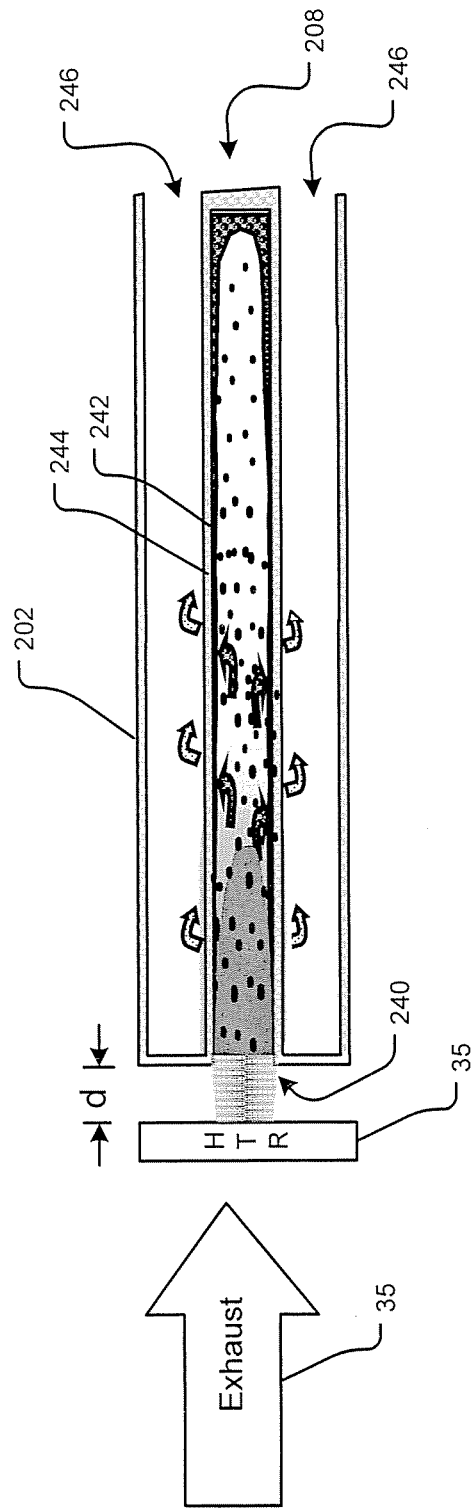
FIG. 6 illustrates heating within the zoned electric heater.

Referring now to FIG. 6, heating within the PM filter assembly 34 is shown in further detail. Exhaust gas 250 passes through the heater 35 and is heated by one or more zones of the heater 35. If spaced from the filter 202, the heated exhaust gas travels a distance "d" and is then received by the filter 202. The distance "d" may be ½" or less. The filter 202 may have a central inlet 240, a channel 242, filter material 244 and an outlet 246 located radially outside of the inlet. The filter may be catalyzed. The heated exhaust gas causes PM in the filter to burn, which regenerates the PM filter. The heater 35 transfers heat by convection and/or conduction to ignite a front portion of the filter 202. When the soot in the front face portions reaches a sufficiently high temperature, the heater is turned off. Combustion of soot then cascades down a filter channel 254 without requiring power to be maintained to the heater.

Figure 7:
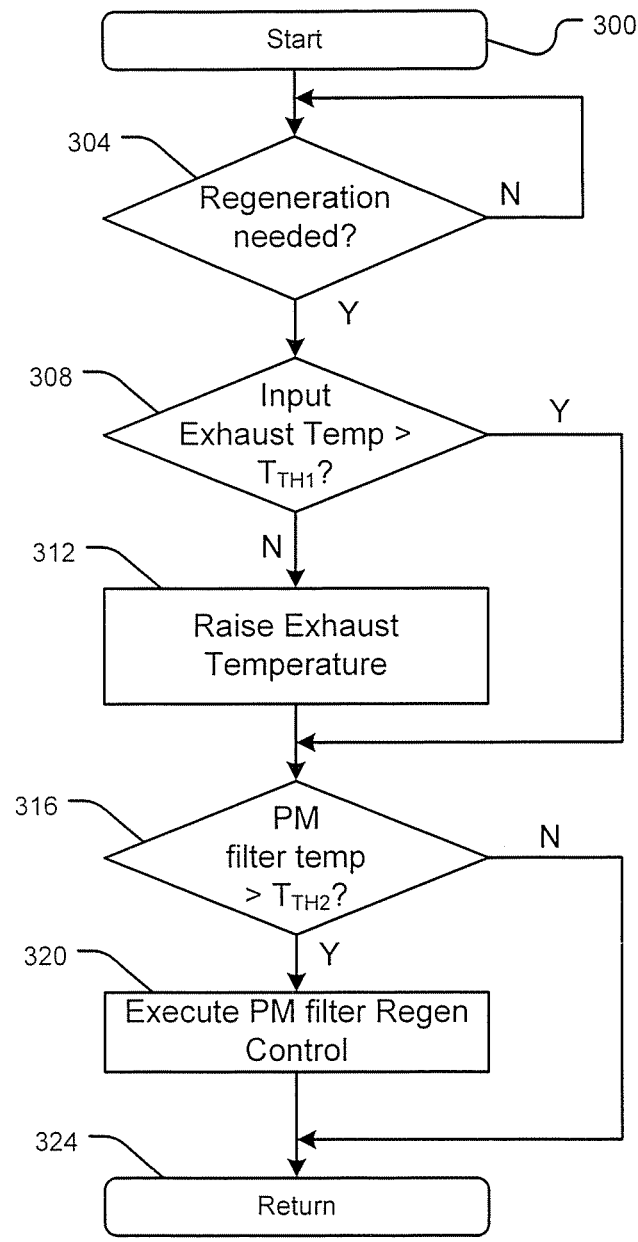
FIG. 7 is a flowchart illustrating exemplary steps performed by the control module to increase exhaust temperature input to the electrically heated PM filter before starting regeneration.

Referring now to FIG. 7, control begins in step 300. In step 304, control determines whether regeneration is needed. If step 308, control determines whether the input exhaust temperature to the PM filter is greater than a first temperature threshold $T_{TH1}$. The first temperature threshold $T_{TH1}$ may be greater than a soot oxidation temperature. The first temperature threshold $T_{TH1}$ may be less than regeneration temperature. For example only, the first temperature threshold $T_{TH1}$ may be selected to be greater than or equal to 550 degrees Celsius.

If step 308 is false, the engine control module increases the exhaust temperature using any suitable approach in step 312. Control continues from steps 312 and 308 (if true) with step 316. If step 316 is true, control determines whether the PM filter temperature is greater than a second temperature threshold $T_{TH2}$. If step 316 is true, control executes PM filter regeneration control. Control continues from steps 316 (if false) and step 320 with step 324.

For example only, the regeneration temperature in the PM filter may be set to approximately greater than or equal to 600 degrees Celsius. For example only, the regeneration temperature in the PM filter may be set to approximately greater than or equal to 700 degrees Celsius. For example only, the regeneration temperature in the PM filter may be set to approximately greater than or equal to 800 degrees Celsius.

Figure 8:
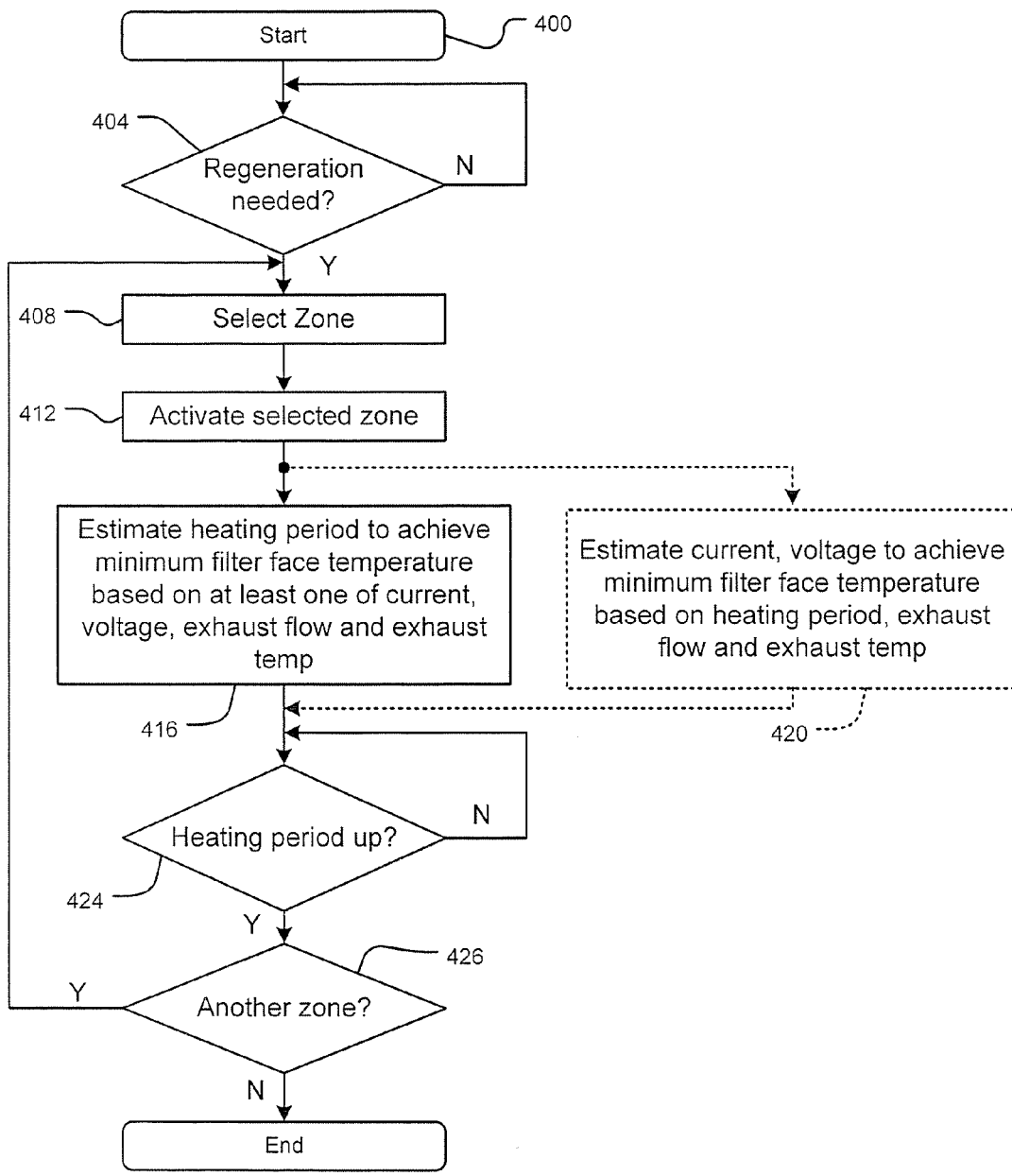
FIG. 8 is a flowchart illustrating exemplary steps for regenerating a zoned electric heater associated with a PM filter.

Referring now to FIG. 8, exemplary steps for regenerating a zoned PM filter are shown. In step 400, control begins and proceeds to step 404. If control determines that regeneration is needed in step 404, control selects one or more zones in step 408 and activates the heater for the selected zone in step 412. In step 416, control estimates a heating period sufficient to achieve a minimum filter face temperature based on at least one of current, voltage, exhaust flow and exhaust temperature. The minimum face temperature should be sufficient to start the soot burning and to create a cascade effect. For example only, the minimum face temperature may be set to 700 degrees Celsius or greater. In an alternate step 420 to step 416, control estimates current and voltage needed to achieve minimum filter face temperature based on a predetermined heating period, exhaust flow and exhaust temperature.

In step 424, control determines whether the heating period is up. If step 424 is true, control determines whether additional zones need to be regenerated in step 426. If step 426 is true, control returns to step 408. Otherwise control ends.

The present disclosure tends to improve regeneration of PM filters. The approach described herein tends to reduce thermal delta and therefore improves substrate durability. Force due to thermal expansion and contraction is defined as $\alpha \Delta TE(Area)$ where $\alpha$ is a coefficient of expansion, E is Young's Modulus, Area is perimeter area and is equal to $\pi D$, and $\Delta T$ is the temperature delta. As can be appreciated, increasing exhaust gas temperature before using the electrical heaters reduces ΔT, which reduces force due to thermal expansion and contraction. For example only, with the exhaust gas at the inlet of the PM filter at approximately 600 degrees C. and the heated zone at 800 degrees C., ΔT is approximately 200 degrees C. The reduced ΔT reduces thermal force and tends to increase durability. The present disclosure also tends to provide more consistent heating patterns and to reduce flameout.

What is claimed is:

1. A system comprising:
a particulate matter (PM) filter including an upstream end for receiving exhaust gas and a downstream end;
an electric heater that is arranged one of spaced from and in contact with the upstream end, wherein the electric heater comprises N zones, wherein N is an integer greater than one, wherein the N zones correspond to longitudinal zones along a length of the PM filter, and wherein a first zone of the N zones of the electric heater includes multiple discontinuous heater sub-zones; and
a control circuit that
determines whether regeneration is needed based on an estimated level of loading of the PM filter and an exhaust flow rate, and
in response to a determination that regeneration is needed, (i) controls an operating parameter of an engine to increase an exhaust temperature to a first temperature during a first period, (ii) after the first period, activates the first zone of the electric heater to initiate regeneration of downstream portions of the PM filter, (iii) deactivates the first zone of the electric heater in response to a minimum filter face temperature being reached, (iv) subsequent to deactivating the first zone, activates a second zone of the N zones of the electric heater, and (v) deactivates the second zone of the electric heater in response to the minimum filter face temperature being reached.

2. The system of claim 1 wherein controlling the operating parameter of the engine includes modifying at least one of fuel delivery to the engine and spark timing.

3. The system of claim 1 further comprising a fuel burner, wherein controlling the operating parameter of the engine includes using the fuel burner to selectively introduce fuel into exhaust gas between the engine and the PM filter.

4. The system of claim 1 further comprising a catalytic oxidizer, wherein controlling the operating parameter of the engine includes injecting excess fuel after an exhaust cycle of the engine.

5. The system of claim 1 wherein each zone of the N zones of the electric heater includes multiple discontinuous heater sub-zones.

6. The system of claim 5 wherein:
the electric heater includes a center portion, a middle portion surrounding the center portion, and an outer portion surrounding the middle portion,
the center portion includes a central sub-zone,
the middle portion includes a first circumferential band of sub-zones,
the outer portion includes a second circumferential band of sub-zones,
the first zone of the electric heater is composed of the central sub-zone and at least one sub-zone of the first second circumferential band of sub-zones,
the second zone of the electric heater is composed of a first plurality of sub-zones of the first circumferential band of sub-zones, a third zone of the N zones of the electric heater is composed of a second plurality of sub-zones of the first circumferential band of sub-zones,
the first plurality of sub-zones and the second plurality of sub-zones are mutually exclusive, and
a fourth zone of the N zones of the electric heater is composed of a plurality of sub-zones of the second circumferential band of sub-zones.

7. The system of claim 1 wherein the control circuit completes regeneration of the PM filter by repeating the activating and the deactivating for each zone of the N zones of the electric heater.

8. The system of claim 1 wherein the control circuit:
estimates a heating period sufficient to reach the minimum filter face temperature based on a heater current, a heater voltage, the exhaust flow rate, and the exhaust temperature; and
deactivates the first zone of the electric heater upon the heating period expiring, wherein the heating period begins upon activation of the first zone of the electric heater.

9. The system of claim 1 wherein the control circuit:
determines at least one of a heater current and a heater voltage based on a predetermined heating period, the exhaust flow rate, and the exhaust temperature;
activates the first zone of the electric heater by applying the heater current and the heater voltage to the first zone of the electric heater; and
deactivates the first zone of the electric heater upon the predetermined heating period expiring, wherein the predetermined heating period begins upon activation of the first zone of the electric heater.

10. The system of claim 1 wherein the control circuit:
estimates the estimated level of loading of the PM filter;
determines that regeneration is needed in response to (i) a comparison of the estimated level of loading of the PM filter to a predetermined level and, concurrently, (ii) the exhaust flow rate being within a predetermined range; and
varies a duration of regeneration based on the estimated level of loading of the PM filter.

11. A method comprising:
providing a particulate matter (PM) filter including an upstream end for receiving exhaust gas and a downstream end;
arranging an electric heater one of spaced from and in contact with the upstream end, wherein the electric heater comprises N zones, wherein N is an integer greater than one, and wherein the N zones correspond to longitudinal zones along a length of the PM filter, and wherein a first zone of the N zones of the electric heater includes multiple discontinuous heater sub-zones;
determining whether regeneration is needed based on an estimated level of loading of the PM filter and an exhaust flow rate; and
in response to a determination that regeneration is needed,
controlling an operating parameter of an engine to increase an exhaust temperature to a first temperature during a first period,
after the first period, activating the first zone of the electric heater to initiate regeneration of downstream portions of the PM filter,
deactivating the first zone of the electric heater in response to a minimum filter face temperature being reached,
subsequent to deactivating the first zone, activating a second zone of the N zones of the electric heater, and deactivating the second zone of the electric heater in response to the minimum filter face temperature being reached.

12. The method of claim 11 wherein controlling the operating parameter of the engine includes modifying at least one of fuel delivery to the engine and spark timing.

13. The method of claim 11 wherein controlling the operating parameter of the engine includes using a fuel burner to selectively introduce fuel into exhaust gas between the engine and the PM filter.

14. The method of claim 11 wherein controlling the operating parameter of the engine includes injecting excess fuel after an exhaust cycle of the engine.

15. The method of claim 11 wherein each zone of the N zones of the electric heater includes multiple discontinuous heater sub-zones.

16. The method of claim 11 further comprising completing regeneration of the PM filter by repeating the activating and the deactivating for each zone of the N zones of the electric heater.

17. The method of claim 11 further comprising:
estimating a heating period sufficient to reach the minimum filter face temperature based on a heater current, a heater voltage, the exhaust flow rate, and the exhaust temperature,
wherein the deactivating the first zone of the electric heater is performed upon the heating period expiring, and
wherein the heating period begins upon activation of the first zone of the electric heater.

18. The method of claim 11 further comprising:
determining at least one of a heater current and a heater voltage based on a predetermined heating period, the exhaust flow rate, and the exhaust temperature,
wherein the activating the first zone of the electric heater is performed by applying the heater current and the heater voltage to the first zone of the electric heater,
wherein the deactivating the first zone of the electric heater is performed upon the predetermined heating period expiring, and
wherein the predetermined heating period begins upon activation of the first zone of the electric heater.

19. The method of claim 11 further comprising:
estimating the estimated level of loading of the PM filter,
wherein the determination that regeneration is needed is made in response to (i) a comparison of the estimated level of loading of the PM filter to a predetermined level and, concurrently, (ii) the exhaust flow rate being within a predetermined range; and
varying a duration of regeneration based on the estimated level of loading of the PM filter.

* * * * *

UNITED STATES PATENT AND TRADEMARK OFFICE
CERTIFICATE OF CORRECTION

PATENT NO. : 9,140,159 B2  
APPLICATION NO. : 11/950545  
DATED : September 22, 2015  
INVENTOR(S) : Eugene V. Gonze et al.

It is certified that error appears in the above-identified patent and that said Letters Patent is hereby corrected as shown below:

On the Title Page,

Item [76] should be changed to Item [75]

Item [73] Assignee, insert the following:

--GM Global Technology Operations LLC, Detroit, MI (US)--

Signed and Sealed this
Twenty-eighth Day of June, 2016

Michelle K. Lee
*Director of the United States Patent and Trademark Office*